April 28, 1970 H. G. AAS 3,508,814
FLEXURE MODE TRANSDUCER FOR OPTICAL BEAM SCANNING
Filed Dec. 19, 1966 2 Sheets-Sheet 1

INVENTOR
HERBERT G. AAS
BY Melvin Pearson Williams
ATTORNEY

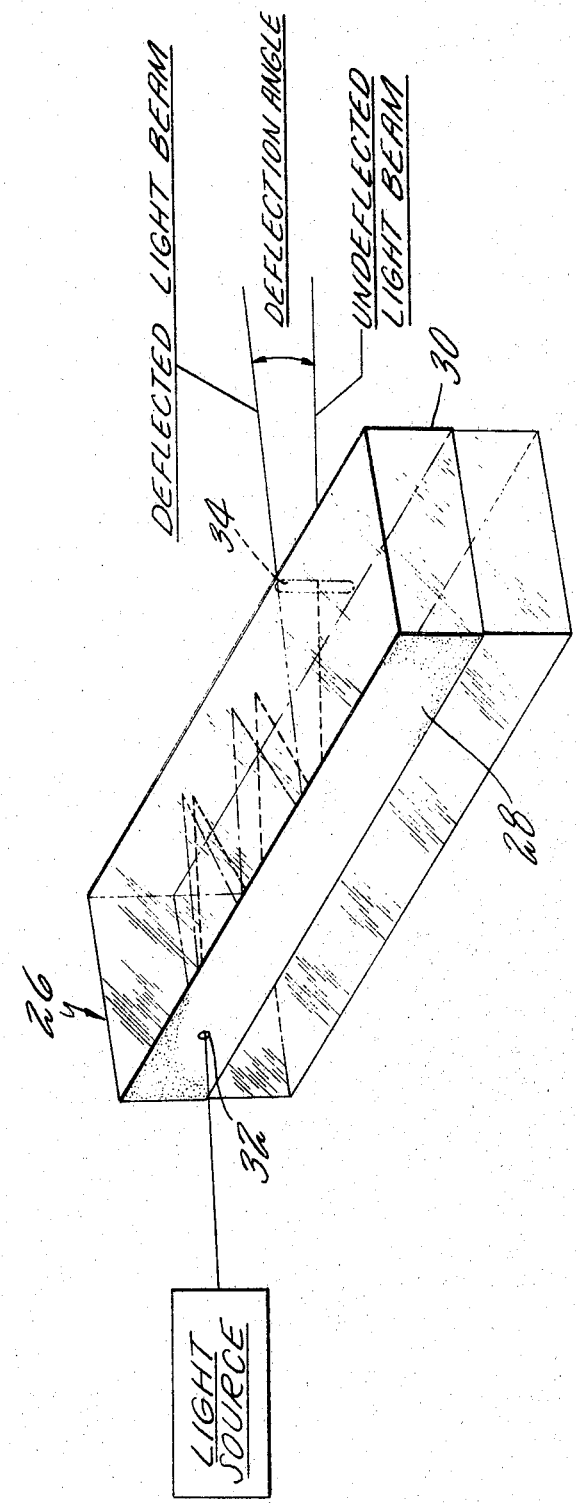

United States Patent Office 3,508,814
Patented Apr. 28, 1970

3,508,814
FLEXURE MODE TRANSDUCER FOR OPTICAL BEAM SCANNING
Herbert G. Aas, East Hartford, Conn., assignor to United Aircraft Corporation, East Hartford, Conn., a corporation of Delaware
Filed Dec. 19, 1966, Ser. No. 602,892
Int. Cl. G02f 1/28, 1/34
U.S. Cl. 350—285            4 Claims

ABSTRACT OF THE DISCLOSURE

Light beams are deflected by solid, optically transparent material vibrated in a flexure mode, which results either from piezoelectric material bonded to another material or bonded to like material in opposite polarity, or by different portions of one piezoelectric material being excited electrically with opposite sense. Flexure results in concomitant differential index of refraction change and attendant directional change which occurs continuously, in an arc, within the flexed device.

---

This invention relates to deflection of an optical beam, and more particularly to deflection of an optical beam by means of a refraction gradient in a crystal under the influence of an ultrasonic force.

Bending of a light beam in a material with an index of refraction variation perpendicular to the direction of light propagation is well known in the art. The light is bent with a radius of curvature which is equal to the index of refraction divided by the spatial index of refraction gradient. When a force is applied to the material, the change in the index of refraction is a function of the compressibility of the material and the force applied in comparison with the index of refraction. As is known in the optical arts, a light beam passing through an index of refraction gradient will bend toward the more dense material. When the applied force is produced by an ultarsonic pressure, the refraction gradient ($dn/dx$) is inversely proportional to the ultrasonic wavelength, which in turn is equal to the velocity of sound within the material used divided by the frequency of the sound wave. The effect of wavelength in reducing the angle of deflection (due to the inverse proportionality described above) limits the usefulness of this method of light beam deflection at lower frequencies.

An object of the invention is to reduce the effect of acoustic wavelength in a light beam deflecting apparatus.

Another object of the invention is to produce a light deflection device capable of operation at frequencies which are lower than those practically obtainable heretofore.

A further object of the present invention is to provide a relatively simple, reliable device for the deflection of light beams.

In accordance with th present invention, a light beam is deflected by solid optically transparent material which is vibrated in a flexure mode. A first embodiment of the invention is analogous to the thermal operation of the well-known bimetallic strip: a piezoelectric material is bonded to another material, the combination of which causes a dimensional change in one material which differs from the dimensional change in the other. The piezoelectric material may be bonded to a like piezoelectric material, the two pieces being oriented in opposite polarity (or handedness), so that as one expands the other will contract, and vice versa. On the other hand, it is possible to bond a material which is nonpiezoelectric to a piece of piezoelectric material so that only one of the two layers which are bonded together will respond to electric forces so as to achieve mechanical elongation. In either case, a flexure will result due to the difference in response to the electric force. Such a module is sometimes referred to as a "duplex plate."

In accordance with one embodiment of the invention, a large flexure is obtained by utilization of two different piezoelectric materials bonded together with opposite mechanical polarity so as to achieve maximum flexure; in this embodiment, however, the index of refraction for the light bending material is that of the piezoelectric crystal: for instance, the index of refraction of quartz is 1.5. In a second embodiment, a material having a much higher index of refraction is bonded to a piezoelectric crystal; in this embodiment, the flexure may be different because of differences in compressibility and dynamic rupture strength in the material chosen, but this material has a higher index of refraction. As an example, an index of refraction of approximately 2.8 is achieved with rutile, which is nonpiezoelectric. Thus, a choice may be made between a greater flexure with a lower index of refraction and a lesser flexure with a higher index of refraction. Other crystalline materials have varying piezoelectric properties, rupture strength and index of refraction, and these may be chosen in combinations and orientations to achieve optimum deflection and service.

In a third embodiment, the flexure mode is achieved by driving a piezoelectric material in opposite directions through the medium of split electrodes which are energized with electrical potentials of opposite polarity, the electrodes being plated on two opposite faces of the material.

The invention herein is readily adapted for multiple passes of the light through the flexure module so as to optimize the deflection angle of the beam.

Other objects, features and advantages of the present invention will become more apparent in the light of the following detailed description of preferred embodiments thereof, as illustrated in the accompanying drawings.

FIGURE 3 is a perspective view of a bicrystallic flexure module capable of providing a light beam with multiple passes therethrough so as to magnify the angle of deflection achieved thereby.

Figure 1:
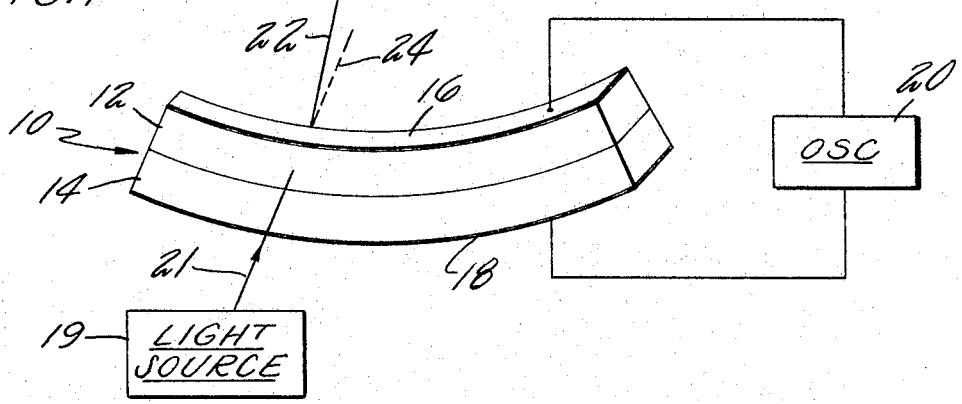
FIGURE 1 is a diagrammatic illustration of one embodiment of the present invention illustrating a bicrystallic flexure module shown during a period of flexure which is concave upward.

Referring now to FIGURE 1, a bicrystallic module 10 comprises two crystalline layers 12, 14 which consist of suitable materials so oriented that there is a difference in mechanical elongation in one of them relative to the other as a result of electrical potentials applied thereto through electrodes 16, 18 which may be plated on the crystalline layers 12, 14, respectively, or through other suitable electrodes. The electrodes 16, 18 are subjected to oscillatory electrical potentials by an oscillator 20, which may be of any suitable well-known type. As an example, the layer 12 may be a nonpiezoelectric material and the layer 14 a piezoelectric material. The layer 14 will expand and contract in response to the oscillatory potentials applied thereto, but the layer 12 affords little or no response to the electrical potentials. When the layer 14 expands the bicrystallic flexure module 10 will assume a concave upward flexure as shown in FIGURE 1. On the other hand, both layers 12, 14 may comprise piezoelectric crystals, the layer 12 being oriented oppositely from the layer 14 in such a fashion that as the layer 14 expands the layer 12 will contract, and vice versa.

Light incident upon the front surface of the layer 12 as illustrated in FIGURE 1 will be bent upwardly as shown by the solid line 22 when the flexure module 10 is bent concave upwardly as illustrated in FIGURE 1. This is due to the aforementioned property of crystalline materials that light will bend in the direction of increasing density in a flexed crystal.

Figure 2:
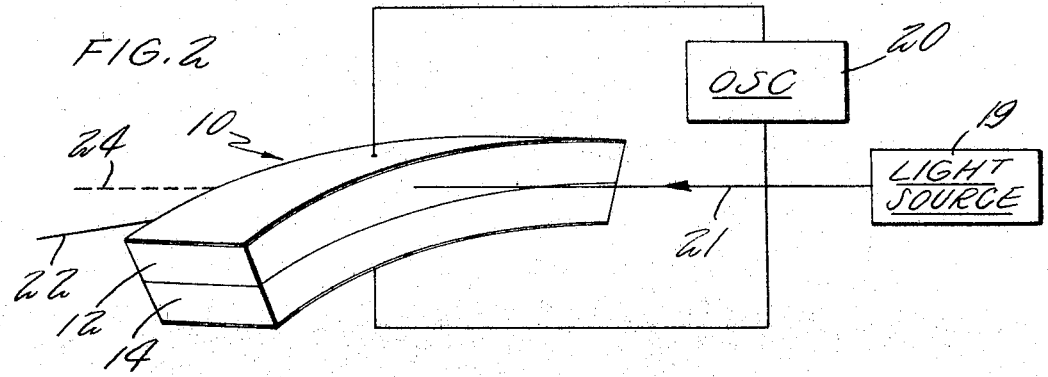
FIGURE 2 is a diagrammatic illustration of the bicystallic flexure module of FIGURE 1 shown when flexed concave downward.

In FIGURE 2 is illustrated the bicrystalline flexure module 10 when the oscillator reaches a phase opposite to that shown in FIGURE 1. In FIGURE 2 the bicrystalline flexure module is flexed concave downwardly whereby a beam of light 21 (from a source 19) entering a side edge of the crystal 12 (as shown in FIGURE 2) will bend downwardly as illustrated by the solid line 22 in contrast to a straight beam as illustrated by the dotted line 24.

In FIGURE 3 is illustrated a bicrystalline flexure module 26 which has reflective surfaces 28, 30 thereon, said reflective surfaces permitting multiple passage of a light beam from a transparent entrance point 32 to a transparent exit point 34. This provides a multiplication of the angle of deflection of the light beam, the multiple effect being equal to the number of passes through the crystal which occur between the entrance into and exit from the bicrystalline flexure module 26.

Figure 4:
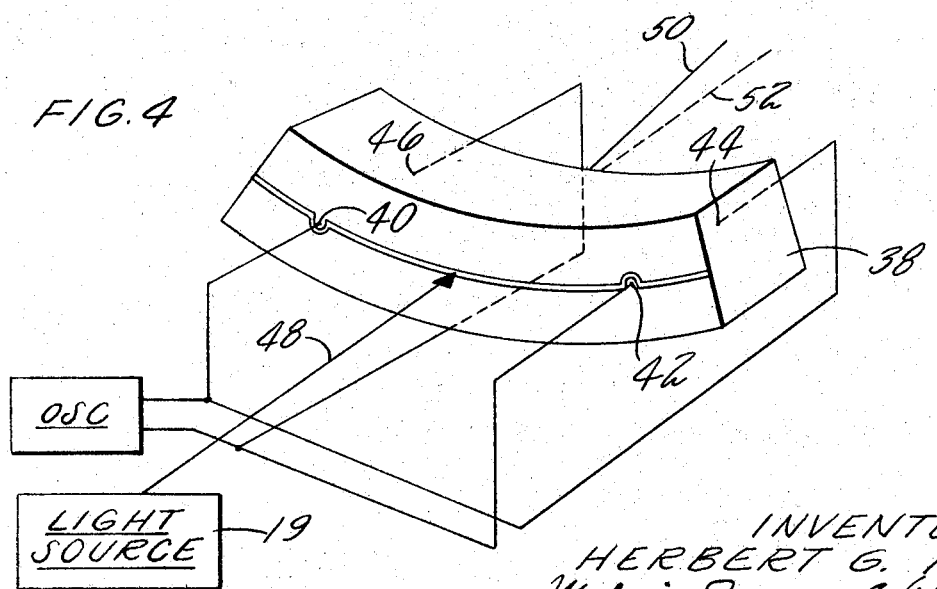
FIGURE 4 is a diagrammatic illustration of a unitary crystal flexure module achieved by dual excitation.

An alternative embodiment of the invention is illustrated in FIGURE 4 wherein a single crystal of piezomaterial 38 includes a pair of spaced electrodes 40, 42 on the near side and a corresponding pair of electrodes on the far side. One electrode 40 on the near side is electrically excited in a first phase with a like electrode 44 on the far side and one electrode 42 on the near side 40 is electrically excited in an opposite phase with a corresponding electrode 46 on the far side. This has the effect of causing the crystal to flex in a manner illustrated in FIGURE 4 during one-half cycle oscillation, and in an opposite manner in the next half cycle of oscillation. As a result of this flexure, light entering the crystal at the near side, between the electrodes, as illustrated by the solid line 48, will be bent upwardly as illustrated by the solid line 50 in contrast with passing straight through as illustrated by the dotted line 52. This flexure method is described in W. P. Mason: Piezoelectric Crystals and Their Application to Ultrasonics, Van Nostrand, 1950, p. 88.

The electrodes are positioned on the single crystal element as shown in FIGURE 4 so as to place them in the center line of the crystal with the electrical connection made at null points, whereby the point of application of the electrodes will undergo a minimum stress as a result of a flexing of the crystal 38. This location of the null point is well known, and is described in Mason, supra, and by C. E. Lane in an article entitled "Duplex Crystals," Bell Laboratories Record, vol. 24, No. 2, p. 59, which describes the bicrystalline duplex plates disclosed herein.

In a preferred form of bicrystalline flexure module in accordance with the present invention the thickness (from top to bottom as shown in FIGURE 1) of each of the crystal pieces would equal one half of the resonant thickness for that crystalline material at the frequency of oscillation which is induced therein by the oscillator. This is due to the fact that when the crystal is mechanically resonant, the center point of the crystal is never under stress: one side being under tension, the other side being in compression; a center line between the two sides is completely neutral in terms of tension and compression. By utilizing a thickness which is equal to half the thickness for resonance, there is theoretically no stress along the bond between the two crystals within the structure.

Although the invention has been shown and described with respect to preferred embodiments thereof, it should be understood by those skilled in the art that various changes and omissions in the form and detail thereof may be made therein without departing from the spirit and scope of the invention.

Having thus described preferred embodiments of the present invention, what I claim as new and desire to secure by Letters Patent of the United States is:

1. A flexure mode light beam deflector comprising:
   a crystal module including material having piezoelectric properties;
   electrical oscillatory excitation means disposed with respect to said crystal for electrically exciting the crystal so as to cause said crystal to flex;
   and a source of light oriented with respect to said crystal so as to introduce a light beam into the crystal in a direction which is parallel with an axis of flexure, whereby said light beam will bend in direct relation with the index of refraction gradient caused by the flexure of said crystal module.

2. The invention described in claim 1 wherein said crystal module comprises a pair of crystalline layers bonded together, said crystalline layers having a relative piezoelectric property in their orientation within said module whereby upon electrical excitation one layer expands and contracts, alternatvely, relative to the other layer as a result of the electrical stress impressed thereon.

3. The invention described in claim 1 wherein said crystal module comprises a single crystal having two sets of electrodes thereon, the electrode sets being subjected to oscillatory energy of opposite phase relative to each other, one electrode set tending thereby to cause expansion of one portion of said crystal simultaneously with the other electrode set tending to cause contraction of another portion of said crystal, whereby said crystal is caused to flex as a result of the dual electrical excitation thereof.

4. A method of causing a beam of light to repetitively scan a traceline comprising the steps of:
   orienting and electrically exciting a material, at least a portion of which has piezoelectric properties oriented with respect to said electrical excitation so as to cause the material to vibrate in a flexure mode;
   and passing a beam of light through said material in a direction which is parallel to an axis of flexure of said material.

References Cited

UNITED STATES PATENTS 3,331,651   7/1967   Sterzer _____ 350—150

RONALD L. WIBERT, Primary Examiner

T. R. MOHR, Assistant Examiner

U.S. Cl. X.R.

350—160